United States Patent
Stewart et al.

(10) Patent No.: US 10,054,997 B2
(45) Date of Patent: Aug. 21, 2018

(54) MULTIVARIABLE CONTROL FOR POWER-LATENCY MANAGEMENT TO SUPPORT OPTIMIZATION OF DATA CENTERS OR OTHER SYSTEMS

(71) Applicant: Honeywell International Inc., Morris Plains, NJ (US)

(72) Inventors: Gregory E. Stewart, North Vancouver (CA); Sohail Nazari, Edmonton (CA); Robert Paul Cartier Dooner, Vancouver (CA)

(73) Assignee: Honeywell International Inc., Morris Plains, NJ (US)

( * ) Notice: Subject to any disclaimer, the term of this patent is extended or adjusted under 35 U.S.C. 154(b) by 436 days.

(21) Appl. No.: 14/869,689

(22) Filed: Sep. 29, 2015

(65) Prior Publication Data

US 2016/0313780 A1   Oct. 27, 2016

Related U.S. Application Data

(60) Provisional application No. 62/151,523, filed on Apr. 23, 2015.

(51) Int. Cl.
*G06F 1/00* (2006.01)
*G06F 1/32* (2006.01)
*G06F 9/50* (2006.01)

(52) U.S. Cl.
CPC ............ *G06F 1/3206* (2013.01); *G06F 1/329* (2013.01); *G06F 9/50* (2013.01); *Y02D 10/24* (2018.01)

(58) Field of Classification Search
None
See application file for complete search history.

(56) References Cited

U.S. PATENT DOCUMENTS

2003/0056126 A1*  3/2003  O'Connor .............. G06F 1/263
                                                          713/300
2004/0236472 A1    11/2004  Junk et al.
(Continued)

OTHER PUBLICATIONS

Honeywell; "Profit Controller Multivariable Control and Optimization Technology"; Apr. 2012; Automation & Control Solutions; Phoenix, AZ; 3 pages.
(Continued)

*Primary Examiner* — Nitin Patel
(74) *Attorney, Agent, or Firm* — Anthony Miologos

(57) ABSTRACT

A method includes identifying demand for computing resources provided by multiple computing devices and identifying operating states or modes for the computing devices based on the demand using a multivariable controller. The multivariable controller is configured to determine how to alter multiple manipulated variables in order to create changes to multiple controlled variables. The multiple manipulated variables include the operating states or modes of the computing devices, and the multiple controlled variables include a power consumption of the computing devices and a response time of the computing devices. Each of the computing devices could include one or more processing units, and each of the computing devices or processing units could be configured to selectively operate in one of the operating states or modes. The method could also include generating a profile identifying a number of computing devices or processing units to operate in each of the operating states or modes.

16 Claims, 12 Drawing Sheets

(56) References Cited

U.S. PATENT DOCUMENTS

| | | | |
|---|---|---|---|
| 2008/0195235 A1* | 8/2008 | Rund | G05B 13/021 |
| | | | 700/33 |
| 2011/0022868 A1 | 1/2011 | Harchol-Baiter et al. | |
| 2011/0078467 A1 | 3/2011 | Hildebrand | |
| 2011/0173467 A1 | 7/2011 | Vaidyanathan et al. | |
| 2011/0301723 A1 | 12/2011 | Pekar et al. | |
| 2012/0173023 A1* | 7/2012 | Fuxman | C12M 41/48 |
| | | | 700/267 |
| 2013/0204403 A1* | 8/2013 | Zheng | G05B 13/048 |
| | | | 700/38 |
| 2013/0317629 A1* | 11/2013 | Shapiro | G05B 13/04 |
| | | | 700/31 |

OTHER PUBLICATIONS

Notification of Transmittal of the International Search Report and the Written Opinion of the International Searching Authority, or the Declaration dated Jul. 19, 2016 in connection with International Patent Application No. PCT/US2016/027073.

Xiaorui Wang et al., "Coordinating Power Control and Performance Management for Virtualized Server Clusters", IEEE Transactions on Parallel Distributed Systems, vol. 22, No. 2, Feb. 2011, p. 245-259.

* cited by examiner

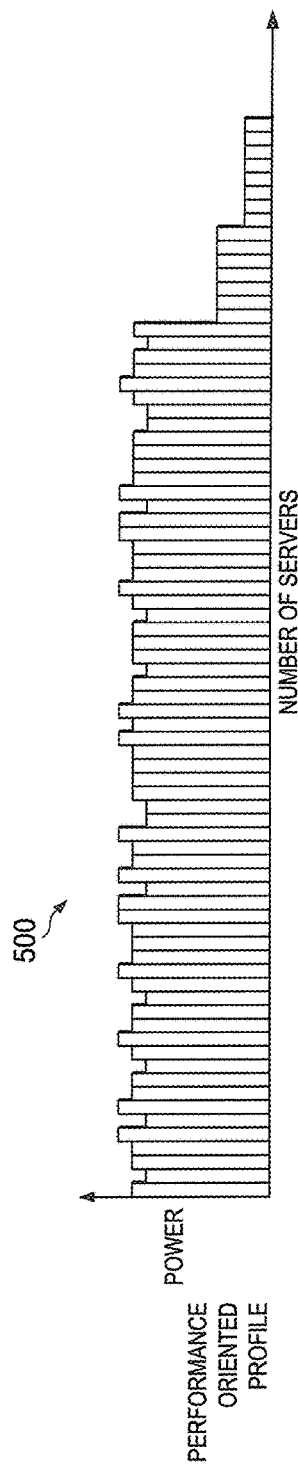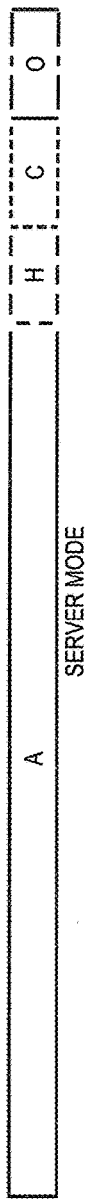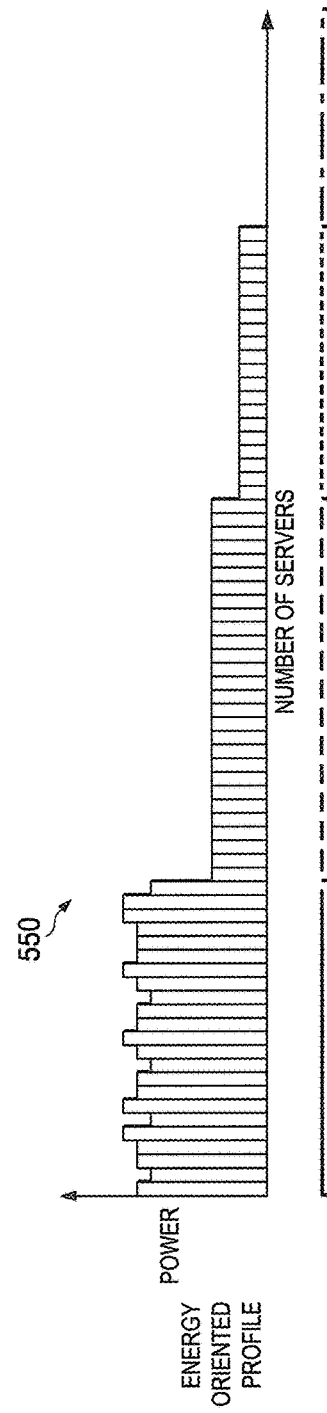
FIG. 5A
FIG. 5B

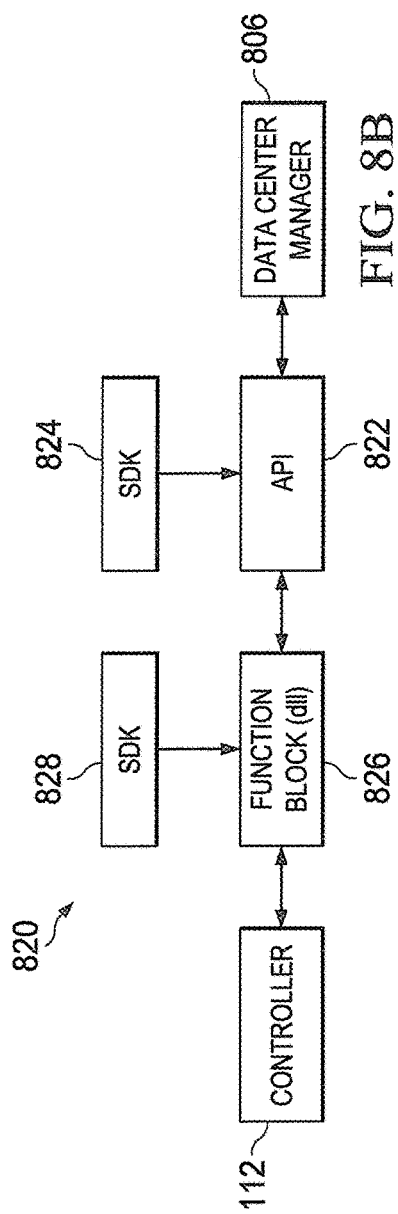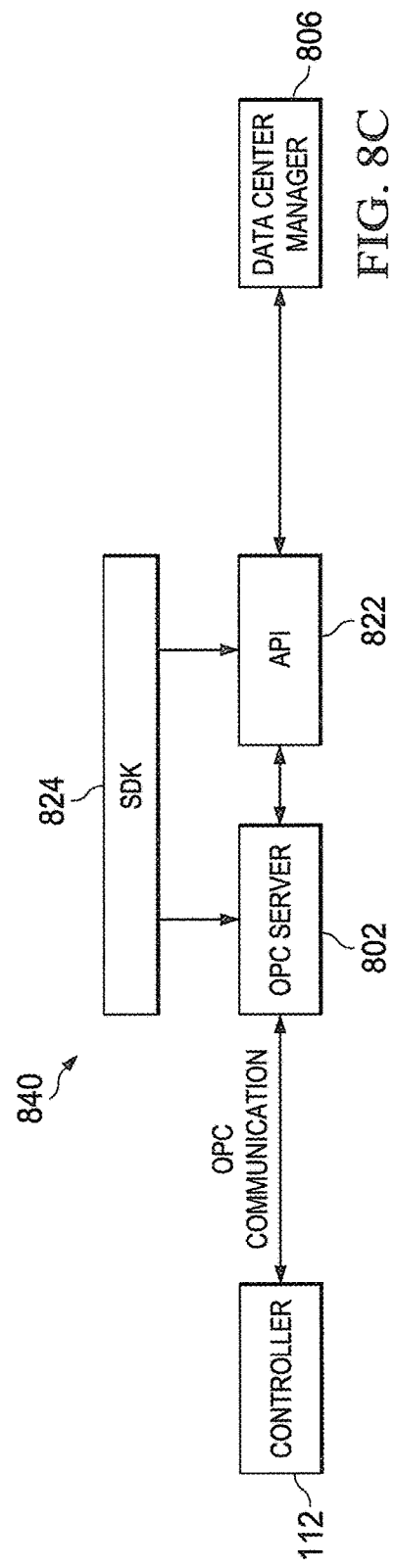

US 10,054,997 B2

MULTIVARIABLE CONTROL FOR POWER-LATENCY MANAGEMENT TO SUPPORT OPTIMIZATION OF DATA CENTERS OR OTHER SYSTEMS

CROSS-REFERENCE TO RELATED APPLICATION AND PRIORITY CLAIM

This application claims priority under 35 U.S.C. § 119(e) to U.S. Provisional Patent Application No. 62/151,523 filed on Apr. 23, 2015. This provisional application is hereby incorporated by reference in its entirety.

TECHNICAL FIELD

This disclosure relates generally to multivariable control techniques. More specifically, this disclosure relates to multivariable control for power-latency management to support optimization of data centers or other systems.

BACKGROUND

Modern data centers can have a huge number of individual computing servers, with some larger data centers having tens of thousands of computing servers or even more. These data centers are often designed so that user-experienced time delay between actions and effects (called "latency") is acceptable at times of maximum data center usage (called "peak times"). As a result, data centers often have over-capacity during non-peak times, meaning the data centers have computing resources that are under-utilized during the non-peak times.

Due to the large numbers of computing servers in modern data centers, those data centers consume an enormous amount of power. It has been estimated that current data centers are collectively responsible for consuming approximately 3% of the world's electricity, and it is estimated that the consumed power will double in the next five years. The cost of electricity is one of the limiting factors in the performance and profitability of a data center. Because of this, data center owners often wish to reduce their electricity usage while preserving the performance of their data centers.

Unfortunately, modern data centers and servers are becoming more and more complex. For example, in one conventional data center energy management approach, each computing server can be placed into one of seven different states corresponding to seven different active/standby modes. While these modes have the potential to assist in power management, there is a tradeoff between using power saving states while still preserving the ability to respond to user demands. Moreover, the complexity of a data center and the complexity of the data center's servers complicate attempts to manage operations of the data center.

SUMMARY

This disclosure relates to multivariable control for power-latency management to support optimization of data centers or other systems.

In a first embodiment, a method includes identifying demand for computing resources provided by multiple computing devices and identifying operating states or modes for the computing devices based on the identified demand using a multivariable controller. The multivariable controller is configured to determine how to alter multiple manipulated variables in order to create changes to multiple controlled variables. The multiple manipulated variables include the operating states or modes of the computing devices, and the multiple controlled variables include a power consumption of the computing devices and a response time of the computing devices.

In a second embodiment, an apparatus includes a multivariable controller having at least one processing device configured to identify demand for computing resources provided by multiple computing devices and identify operating states or modes for the computing devices based on the identified demand. The at least one processing device is configured to identify the operating states or modes for the computing devices by determining how to alter multiple manipulated variables in order to create changes to multiple controlled variables. The multiple manipulated variables include the operating states or modes of the computing devices, and the multiple controlled variables include a power consumption of the computing devices and a response time of the computing devices.

In a third embodiment, a non-transitory computer readable medium contains computer readable program code that, when executed, causes at least one processing device of a multivariable controller to identify demand for computing resources provided by multiple computing devices. The medium also includes computer readable program code that, when executed, causes the at least one processing device to identify operating states or modes for the computing devices based on the identified demand by determining how to alter multiple manipulated variables in order to create changes to multiple controlled variables. The multiple manipulated variables include the operating states or modes of the computing devices, and the multiple controlled variables include a power consumption of the computing devices and a response time of the computing devices.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which:

FIGS. 5A and 5B illustrate example profiles representing possible operating state or mode configurations for a group of computing devices according to this disclosure;

FIGS. 8A through 8C illustrate examples of specific implementations of control systems for power-latency management to support optimization of data centers or other systems according to this disclosure;

DETAILED DESCRIPTION

FIGS. 1 through 10, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1A:
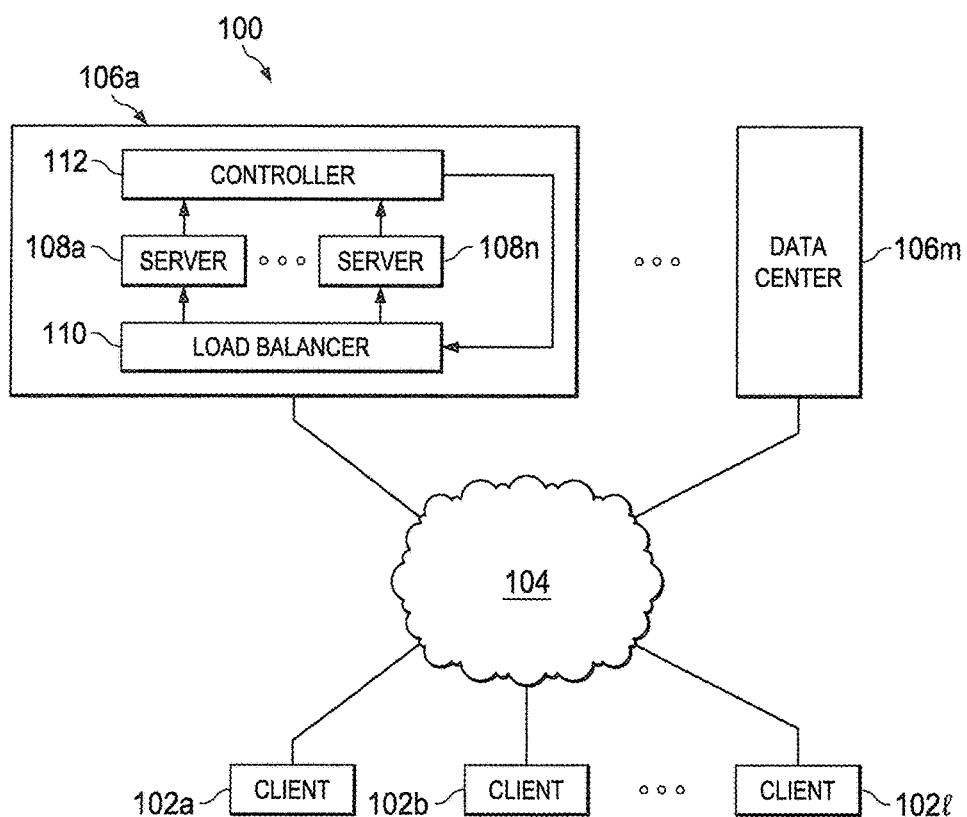
FIGS. 1A and 1B illustrate an example computing system including one or more data centers according to this disclosure.
Figure 1B:
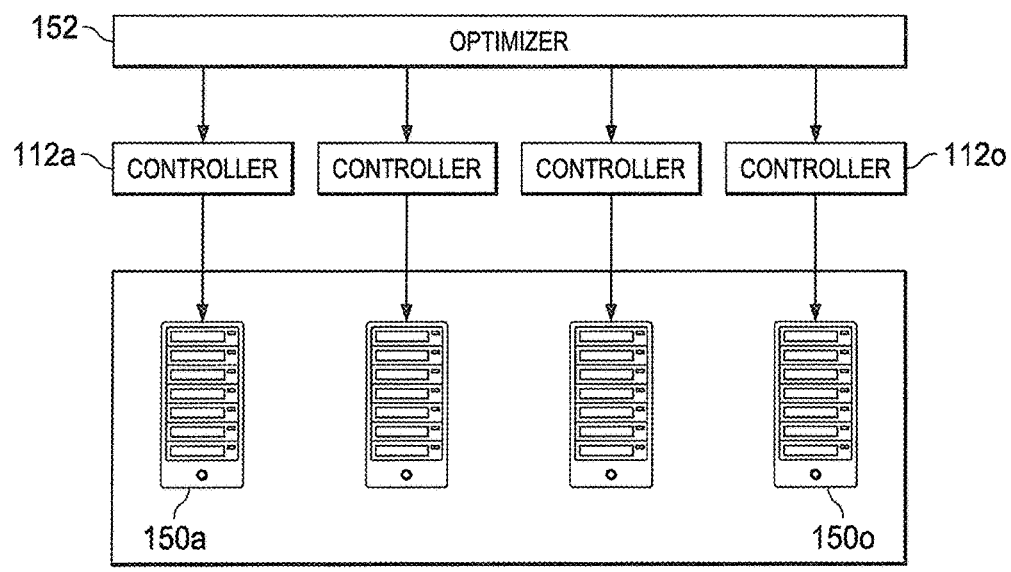

FIGS. 1A and 1B illustrate an example computing system 100 including one or more data centers according to this disclosure. As shown in FIG. 1A, the system 100 includes multiple clients 102a-102l. The clients 102a-102l represent computing devices or systems used by customers wishing to obtain computing services from one or more data centers. Each of the clients 102a-102l represents any suitable computing device(s) or system(s) at one or more locations.

The clients 102a-102l are configured to communicate over at least one network 104. The network 104 facilitates communication between various components in the system 100. For example, the network 104 may transport Internet Protocol (IP) packets, frame relay frames, Asynchronous Transfer Mode (ATM) cells, or other information between network addresses. The network 104 may include one or more local area networks (LANs), metropolitan area networks (MANS), wide area networks (WANs), all or a portion of a global network such as the Internet, or any other communication system or systems at one or more locations.

One or more data centers 106a-106m are configured to provide computing services to the clients 102a-102l. Each data center 106a-106m could be configured to provide any suitable computing service(s) to its customers. For example, each data center 106a-106m could be used to provide "cloud computing" services or other remote computing services to customers.

In the example shown in FIG. 1A, each data center 106a-106m can include multiple servers 108a-108n and one or more optional load balancers 110. The servers 108a-108n generally denote computing devices that perform specified functions in a data center 106a-106m. Often times, different servers 108a-108n are used to perform different types of functions in a data center 106a-106m. For example, some servers 108a-108n could denote web servers or other servers used to support interactions with the clients 102a-102l via the network 104. Other servers 108a-108n could denote application servers or other servers used to execute applications that provide services to the clients 102a-102l. Still other servers 108a-108n could denote database servers or other servers that manage data used in the data center 106a-106m. Any other or additional types of servers could be used in the data center 106a-106m. Each server 108a-108n includes any suitable structure for performing one or more processing functions.

Each server 108a-108n in a data center 106a-106m could operate in one of multiple states corresponding to one or multiple modes. Any suitable number of modes could be used, where different modes denote different levels of operational readiness and have different power consumptions and/or different latencies associated with the "wakeup time" to switch from standby to active operation. As one particular example, a server could support four modes, such as off, two standby/sleep modes, and one active mode. As another particular example, a server could support six modes, such as off, a standby mode, and four performance modes. As yet another particular example, a server could support seven modes, such as off, two standby modes, and four performance modes. However, any other or additional modes could be used, and different servers 108a-108n in the same data center 106a-106m or in different data centers 106a-106m could use different modes.

Each load balancer 110 helps to distribute computing workloads amongst the various servers 108a-108n in a data center 106a-106m. For example, when a data center 106a-106m includes multiple servers 108a-108n that receive and process requests from the clients 102a-102l, the load balancer 110 can help to distribute those requests in a suitable manner (such as a round robin or modified round robin approach). Each load balancer 110 includes any suitable structure for distributing workloads across multiple computing devices.

Note that the data centers 106a-106m need not have the same configuration. Different data centers 106a-106m could have different arrangements of servers, load balancers, and other components according to particular needs. Also, a single entity could be associated with a single data center 106a-106m or multiple data centers 106a-106m, and the system 100 could include data centers associated with any number of entities.

As shown in FIG. 1A, at least one of the data centers 106a-106m includes a multivariable controller 112. The multivariable controller 112 implements a multivariable control technique to determine how to adjust the operating states or modes of the servers 108a-108n in one or more of the data centers 106a-106m. The multivariable controller 112 can make the adjustments while attempting to reduce or minimize power consumption and while at the same time helping to ensure that adequate computing resources are available to satisfy customer demand (such as by maintaining satisfactory latency from the users' perspectives).

The multivariable controller 112 includes any suitable structure supporting multivariable control, such as a server or other computing device. The multivariable controller 112 also supports any suitable multivariable control technology. In some embodiments, the multivariable controller 112 can be implemented using a Robust Multivariable Predictive Control Technology (RMPCT) controller or other type of controller implementing model predictive control or other advanced process control. As a particular example, the multivariable controller 112 could implement a PROFIT CONTROLLER or PROFIT OPTIMIZER from HONEYWELL INTERNATIONAL INC. Other example components that could be incorporated include a PROFIT SENSORPRO, PROFIT STEPPER, PROFIT EXPERT, or CONTROL PERFORMANCE MONITOR from HONEYWELL INTERNATIONAL INC.

As an example of the multivariable control functionality, model predictive control (MPC) is a well-known control technique in industrial settings. MPC uses one or more models to predict how one or more controlled variables (CVs) in an industrial process will act in the future in response to changes to one or more manipulated variables (MVs) and/or one or more disturbance variables (DVs). A controlled variable denotes a variable whose value is controlled to be at or near a setpoint or within a desired range or optimized in some sense (typically maximized or minimized). A manipulated variable denotes a variable that is adjusted in order to alter the value of at least one controlled variable. A disturbance variable denotes a variable whose value can be considered when determining how to adjust one or more manipulated variables to achieve a desired change in one or more controlled variables, but the disturbance variable itself cannot be controlled or adjusted.

It is often the case that (i) a single manipulated variable or disturbance variable affects multiple controlled variables and (ii) multiple manipulated variables could be changed to alter a controlled variable in a desired manner. Thus, MPC control is often cast as a multivariable problem in which a controller attempts to determine how to adjust multiple manipulated variables in order to keep one or more controlled variables at their setpoints or within their acceptable limits. Often times, this takes the form of an economic optimization problem in which the controller attempts to determine how to adjust the manipulated variables while satisfying some specified goal or goals, such as maximizing an industrial plant's profit or minimizing the usage of raw materials by the industrial plant.

The multivariable controller 112 executes one or more MPC or other advanced control techniques that are customized for a data center setting. For example, as noted above, each server 108a-108n could operate in one of multiple states corresponding to one of multiple modes, where different modes have different power consumptions and/or associated latencies. As a result, the state or mode of each server 108a-108n or each group of servers 108a-108n in a data center 106a-106m could represent a manipulated variable that is used by the multivariable controller 112. Also, controlled variables used by the multivariable controller 112 could include (i) power consumption by a single server, a group of servers, a data center, or a group of data centers and (ii) response time of the data center(s) to customer requests. The economic optimization problem could be cast as one that attempts to minimize power consumption and/or minimize response time while providing adequate computing resources for current or predicted customer demand. There can also be one or more constraints placed on the optimization problem, such as a constraint that avoids repetitive state or mode changes to any single server. The response time can be defined as the total number of requests per second (RPS) handled in a data center, which is defined as the sum of the RPS values for individual servers in the data center.

One or more models used by the multivariable controller 112 could be generated in any suitable manner. For example, one or more models could be generated using historical data from which it is possible to correlate changes to operating states or modes of servers with changes in power consumption or with changes in response time. As another example, testing could be done to measure the power consumption of servers when operating in different states or modes and to measure changes to response times based on the number of servers and their operating states or modes.

The output of the multivariable controller 112 could take various forms. For example, the multivariable controller 112 could operate to generate at least one server profile that identifies the number of servers 108a-108n in at least one data center 106a-106m that should operate in each state or mode (such as the number of servers that are off, in different standby/sleep modes, and in different active or performance modes). The profile(s) could be used by the multivariable controller 112 to output control signals to individual servers or groups of servers in order to set or alter the servers' operating states or modes. The profile(s) could also be output from the multivariable controller 112 to a data center manager or other component, which then outputs control signals to the individual servers or groups of servers in order to set or alter the servers' operating states or modes.

Note that this type of multivariable control for one or more data centers is well-suited for integration with predictions of customer demand (workload), which can be identified in any suitable manner. For example, predictions can be created via knowledge of a data center and its scheduled activities. Predictions can also be created using data-driven techniques in which the workload in a data center is monitored over long periods of time and its patterns (such as daily, weekly, or event driven) are learned and incorporated into a real-time prediction of workload. The multivariable controller 112 can take the estimated workload as an input and use it internally, such as to determine a future prediction of a disturbance variable.

In this way, power and latency issues for at least one data center are cast in a multivariable control framework, which enables an optimal control-based approach. Moreover, this approach can accommodate an arbitrary number of server states, such as any number of server states in which at least two of the states have different power or latency characteristics. In addition, this approach is scalable in that it can be applied to a single-tier data center, a multi-tier data center, and multi-site data centers. Additional details regarding operations of the multivariable controller 112 are provided below.

Note that in FIG. 1A, the multivariable controller 112 is shown as residing in the data center 106a. However, the same multivariable controller 112 could be used to control the operational states or modes of the servers in one or more other data centers, or different data centers could include their own multivariable controllers. Moreover, the multivariable controller 112 need not reside in any of the data centers and could reside in a location where the data centers can be accessed.

In addition, multiple multivariable controllers could be used with one or more data centers. For example, as shown in FIG. 1B, the servers 108a-108n in one or more data centers 106a-106m can be partitioned into multiple collections 150a-150o. Each collection 150a-150o of servers can be controlled by a multivariable controller 112a-112o, respectively. Each of the multivariable controllers 112a-112o could perform the same or similar functions as the multivariable controller 112 described above, except that each of the multivariable controllers 112a-112o separately controls a different subset of the servers. An optimizer 152 (such as a PROFIT OPTIMIZER from HONEYWELL INTERNATIONAL INC.) can be used to coordinate and optimize the operations of the multivariable controllers 112a-112o in a hierarchical manner. This may allow, for example, the optimizer 152 to control setpoints or other information used by the multivariable controllers 112a-112o so that the overall process is optimized. Note that while various features and functions of the multivariable controller 112 are provided below, such descriptions apply equally to the multivariable controllers 112a-112o.

Although FIGS. 1A and 1B illustrate one example of a computing system including one or more data centers, various may be made to FIGS. 1A and 1B. For example, the system 100 could include any number of clients, networks, data centers, servers, load balancers, multivariable controllers, collections of servers, and optimizers. Also, the functional divisions shown in FIGS. 1A and 1B are for illustration only. Various components in FIGS. 1A and 1B could be omitted, combined, or further subdivided and additional components could be added according to particular needs. As a particular example, the multivariable controller 112 could be integrated into another component or components of a data center. Further, computing systems come in a wide variety of configurations, and FIGS. 1A and 1B do not limit this disclosure to any particular configuration of computing system. In addition, while often described in this patent document as being used to control servers in one or more data centers, one or more multivariable controllers 112 could be used to help optimize operations of any suitable computing devices in any suitable system(s).

Figure 2:
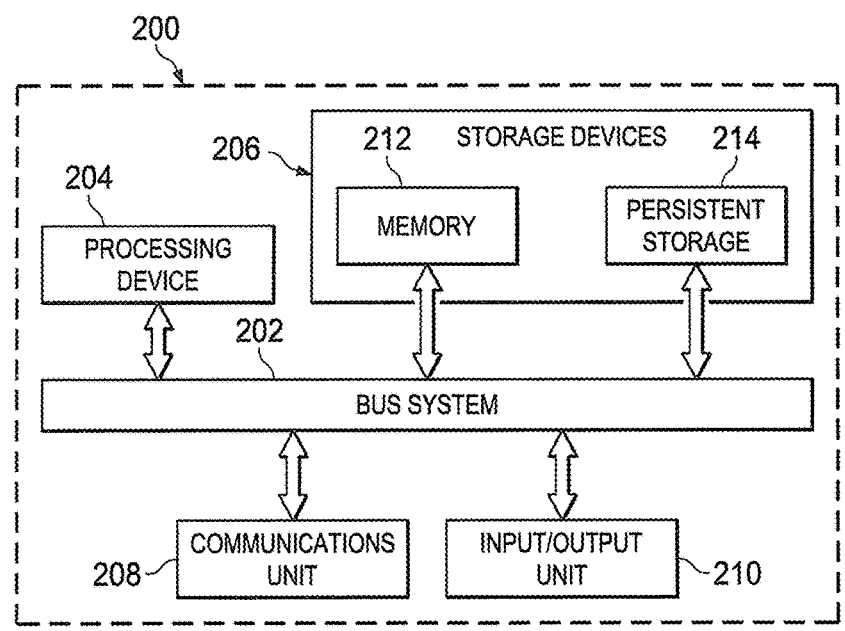
FIG. 2 illustrates an example device providing multivariable control for power-latency management to support optimization of data centers or other systems according to this disclosure.

FIG. 2 illustrates an example device 200 providing multivariable control for power-latency management to support optimization of data centers or other systems according to this disclosure. The device 200 could, for example, represent the multivariable controller 112 in the system 100 of FIGS. 1A and 1B. However, the multivariable controller 112 could be implemented using any other suitable device or system, and the multivariable controller 112 could be used in any other suitable system.

As shown in FIG. 2, the device 200 includes a bus system 202, which supports communication between at least one processing device 204, at least one storage device 206, at least one communications unit 208, and at least one input/output (I/O) unit 210. The processing device 204 executes instructions that may be loaded into a memory 212. The processing device 204 may include any suitable number(s) and type(s) of processors or other devices in any suitable arrangement. Example types of processing devices 204 include microprocessors, microcontrollers, digital signal processors, field programmable gate arrays, application specific integrated circuits, and discrete circuitry.

The memory 212 and a persistent storage 214 are examples of storage devices 206, which represent any structure(s) capable of storing and facilitating retrieval of information (such as data, program code, and/or other suitable information on a temporary or permanent basis). The memory 212 may represent a random access memory or any other suitable volatile or non-volatile storage device(s). The persistent storage 214 may contain one or more components or devices supporting longer-term storage of data, such as a read only memory, hard drive, Flash memory, or optical disc.

The communications unit 208 supports communications with other systems or devices. For example, the communications unit 208 could include a network interface that facilitates communications over at least one Ethernet, HART, FOUNDATION FIELDBUS, or other network. The communications unit 208 could also include a wireless transceiver facilitating communications over at least one wireless network. The communications unit 208 may support communications through any suitable physical or wireless communication link(s).

The I/O unit 210 allows for input and output of data. For example, the I/O unit 210 may provide a connection for user input through a keyboard, mouse, keypad, touchscreen, or other suitable input device. The I/O unit 210 may also send output to a display, printer, or other suitable output device.

As described above, the device 200 could execute instructions used to perform any of the functions associated with the multivariable controller 112. For example, the device 200 could execute instructions that monitor or predict customer demand for computing resources. The device 200 could also execute instructions that use an economic optimization problem to determine how to adjust operating states or modes of servers while minimizing power consumption, minimizing response time, and satisfying current or predicted customer demand. The device 200 could further execute instructions that allow the device 200 to control or adjust the operating states or modes of the servers 108a-108n in one or more data centers 106a-106m.

Although FIG. 2 illustrates one example of a device 200 providing multivariable control for power-latency management to support optimization of data centers or other systems, various changes may be made to FIG. 2. For example, various components in FIG. 2 could be combined, further subdivided, or omitted and additional components could be added according to particular needs. Also, computing devices can come in a wide variety of configurations, and FIG. 2 does not limit this disclosure to any particular configuration of computing device.

Figure 3:
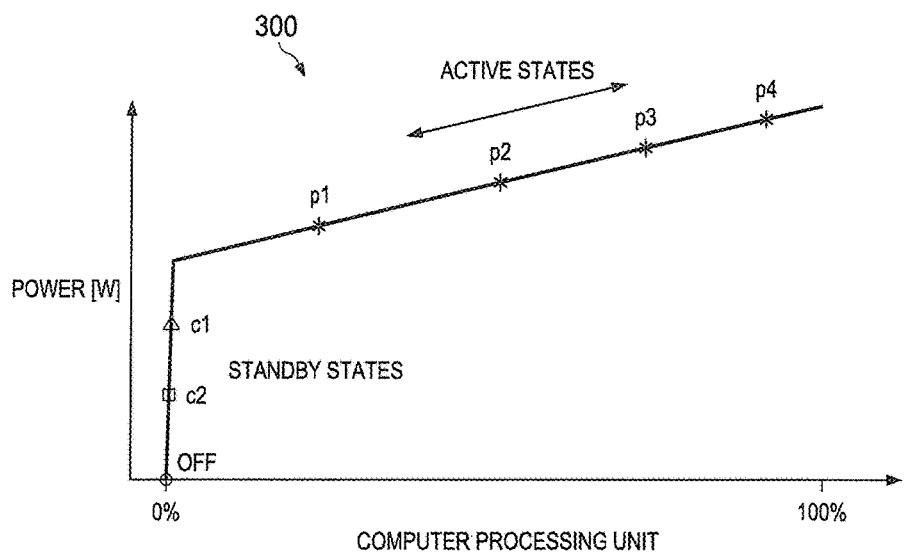
FIGS. 3 and 4 illustrate example graphs representing possible variations in power consumption and time response for different operating states or modes of a computing device according to this disclosure.
Figure 4:
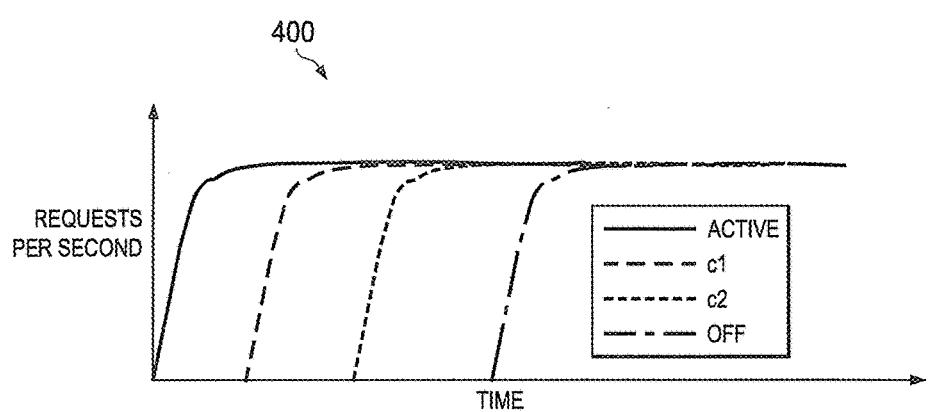

FIGS. 3 and 4 illustrate example graphs 300 and 400 representing possible variations in power consumption and time response for different operating states or modes of a computing device according to this disclosure. Effective power management of at least one data center or other location(s) with multiple computing devices is often based on a tradeoff between energy usage and performance. Maximum steady-state energy efficiency can often be achieved by maximizing the number of servers in a minimum energy state or mode (usually one of several standby/sleep states or modes or an "off" state or mode). Conversely, the maximum ability to respond to user demands can often be achieved by placing the maximum number of servers in the highest performing "active" state or mode.

Consider the graph 300 shown in FIG. 3, which illustrates the power consumption of an example computing server in different operating states or modes. The different operating states or modes are associated with different central processing unit (CPU) utilizations and power consumptions. As can be seen in FIG. 3, the power usage by the computing server depends on its operating state or mode. The computing server draws no power in the off state or mode and draws progressively more power in different standby/sleep states or modes (denoted c2 and c1), but those states or modes may involve no or minimal usage of processing resources. In various active states or modes, the power drawn by the computing server varies based on CPU utilization in different performance states (denoted p1 through p4).

Also consider the graph 400 shown in FIG. 4, which illustrates the time response of an example computing server in different operating states or modes. As can be seen in FIG. 4, the ability of a computing server to respond to user demand depends on its state or mode. Each of the states or modes has a different startup time, which is often expressed as a delay. This delay can be significant. For example, with some servers, the delay could be approximately ten minutes to move from the "off" state to one of the "active" states.

The information in FIGS. 3 and 4 shows that the operating states or modes of computing servers in one or more data centers can be controlled in order to achieve suitable response times while reducing or minimizing power consumption. Moreover, the operating states or modes of computing servers in one or more data centers can be controlled to reduce or minimize service level agreement (SLA) violations in the data center(s). The multivariable controller 112 could therefore operate as described below to adjust the operating states or modes of the computing servers. For example, the multivariable controller 112 could generate at least one profile for at least one data center, where each profile identifies the number of computing servers in a collection of computing servers operating in each mode. The selection of the specific computing servers to operate in each mode could be determined by the multivariable controller 112 or by one or more data center managers or other components that receive the profiles from the multivariable controller 112.

As a particular example of this functionality, the multivariable controller 112 could use the following values as manipulated variables: $u_a$, $u_h$, $u_c$, and $u_o$. Here:

$0 \leq u_a \leq N$, where $u_a$ represents the number of servers in the "active" modes;

$0 \leq u_h \leq N$, where $u_h$ represents the number of servers in a higher standby/sleep mode;

$0 \leq u_c \leq N$, where $u_c$ represents the number of servers in a lower standby/sleep mode;

$0 \leq u_o \leq N$, where $u_o$ represents the number of servers in the "off" mode; and $u_a + u_h + u_c + u_o = N$, where N represents the total number of servers.

Note, however, that a variety of other manipulated variables could be used.

The tradeoff in the control problem used by the multivariable controller 112 is between minimizing response time to load demands and minimizing power consumption. The solution generated by the multivariable controller 112 provides a value of $u_a$ large enough that total load (L) can be delivered, meaning:

$$u_a \geq L/(\text{single server capacity}).$$

The optimization can trade off power against desired time response to different size steps in total load.

Note that in the example shown in FIG. 3, there are seven states for the servers, including four active states. However, servers can have any number of active states, which are often referred to as performance states. Servers in different performance states are active but have different power-saving levels. In these embodiments, the multivariable controller 112 could use the number of servers in each performance state as manipulated variables.

Moreover, while shown here as using the number of servers in different states or modes as manipulated variables, other types of manipulated variables could be used. For example, the multivariable controller 112 could use the number of servers to transition between different states or modes as manipulated variables. As particular examples, the manipulated variables could include the number of servers to transition between different performance states, the number of servers to transition between different standby/sleep states, and number of servers to transition between the highest standby/sleep state and the lowest performance state.

In the above example, a single location and a single-tier data center are considered. In a single-tier data center, the number of manipulated variables n in some embodiments can be equivalent to:

$$n = (\text{\# of possible server states})$$

The states can include both performance states (such as active but power-saving states) and sleep/standby states for servers.

This approach can be expanded to multi-tier data centers. Many data centers are multi-tiered, and different tiers may be responsible for different types of tasks. In this case, the single-tier approach above scales to multiple tiers by partitioning the tiers and manipulating the server states in each tier separately while considering the overall latency of the multiple tiers. Here, the number of manipulated variables n in some embodiments can be equivalent to:

$$n = (\text{\# of possible server states}) \times (\text{\# of tiers})$$

Note that in large data centers, the number of server states is typically much smaller (n is often in the range of two to ten or so) than the total number of servers (N can easily reach into the thousands). In situations where n<<N, designing a controller whose MVs correspond to the number of states is a much smaller optimization problem than a brute-force optimization over the whole set of servers.

This approach can also be expanded to multi-site data centers. Some organizations choose to distribute their computing needs across multiple data centers, including organizations that use data centers provided by others. Some of these data centers are located in various parts of the world (United States, Europe, etc.). The optimization and control problem used by the multivariable controller 112 can be generalized to this case by considering local electricity pricing as well as the increased latency due to distributing tasks over large geographical distances.

Although FIGS. 3 and 4 illustrate examples of graphs 300 and 400 representing possible variations in power consumption and time response for different operating states or modes of a computing device, various changes may be made to FIGS. 3 and 4. For example, the behaviors of the computing device shown in FIGS. 3 and 4 are for illustration only, and other computing devices can have other behaviors. Also, computing devices can have other or additional modes or states, and different computing devices can have different numbers of modes or states.

FIGS. 5A and 5B illustrate example profiles 500 and 550 representing possible operating state or mode configurations for a group of computing devices according to this disclosure. In this example, each profile 500 and 550 defines the numbers of computing devices operating in different states or modes, where the different states or modes affect power consumption and time response.

As shown in FIGS. 5A and 5B, each profile 500 and 550 identifies the number of computing devices operating in active (A), a higher standby (H), a lower standby (C), and off (O) states or modes. The profile 500 in FIG. 5A is a performance-oriented profile, meaning the profile has a larger number of servers in the active state or mode in order to provide higher performance (lower latency). The profile 550 in FIG. 5B is an energy-oriented profile, meaning the profile has a smaller number of servers in the active state or mode in order to reduce power consumption.

Figure 6:
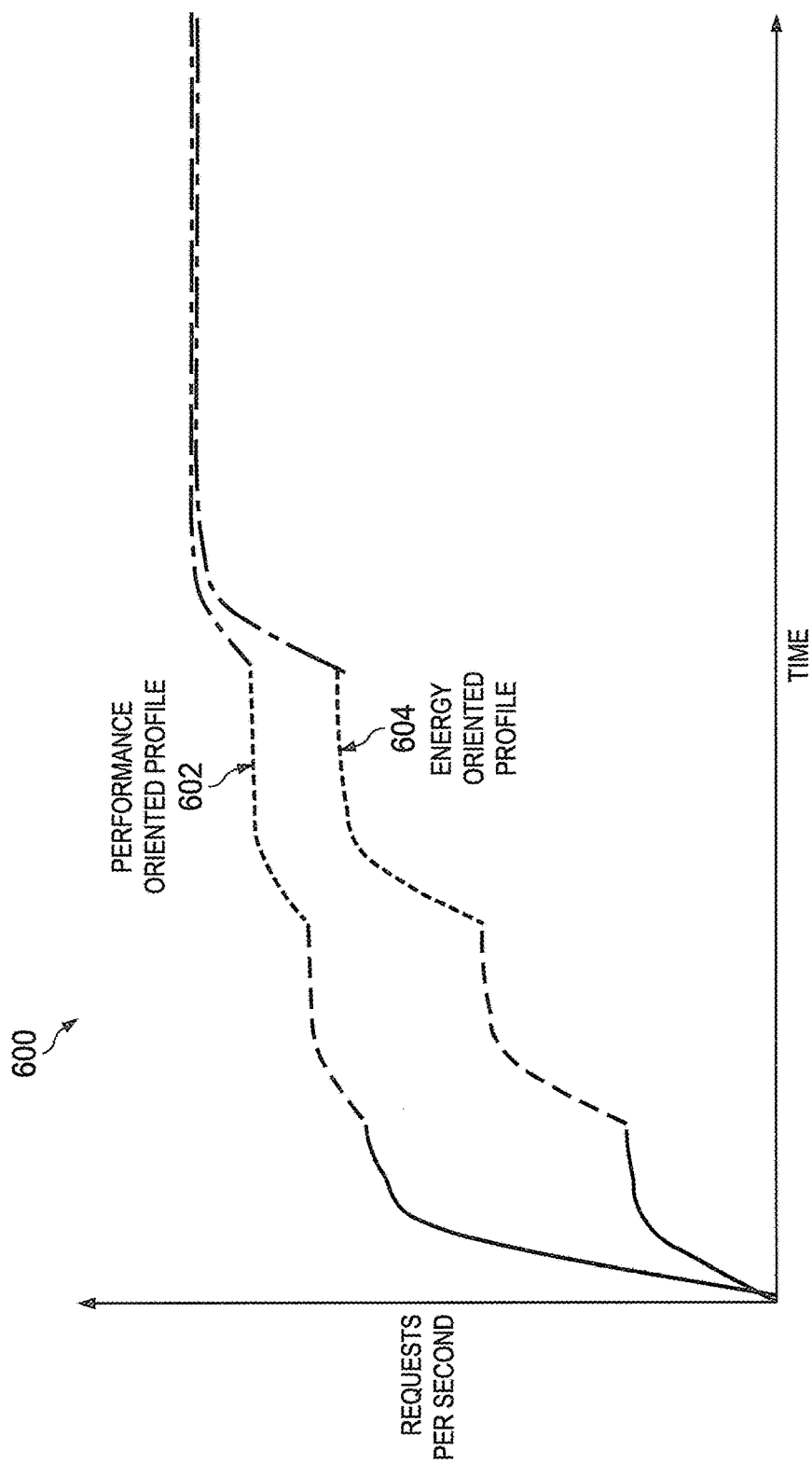
FIG. 6 illustrates an example graph representing time response curves for different operating state or mode profiles for a group of computing devices according to this disclosure.

These profiles 500 and 550 have different power consumptions and time responses. FIG. 6 illustrates an example graph 600 representing time response curves for different operating state or mode profiles for a group of computing devices according to this disclosure. In particular, a line 602 represents the time response curve associated with the performance-oriented profile 500, and a line 604 represents the time response curve associated with the energy-oriented profile 550. Each time response curve is based on the wakeup and boot-up times of servers being switched from a sleep state into an active state. This means that when a controller makes a request for a server to become active, there is a period where the server does little or no useful computations while it is booting up before the server finally becomes available to process computing jobs.

In FIG. 6, a large load "step" or change occurs in user demand for computing services. It can take different amounts of time for a computing server to transition between states or modes, so the data center's ability to respond to the load step in user demand depends on the profile of the computing servers in use when the load step occurs. The performance-oriented profile 500 and the energy-oriented profile 550 both eventually respond to the load step, but the energy-oriented profile 550 responds more slowly because there are fewer servers in the active states or modes. Smaller load steps may require fewer state or mode changes, so the differences between the profiles may be less noticeable.

Although FIGS. 5A and 5B illustrate examples of profiles 500 and 550 representing possible operating state or mode configurations for a group of computing devices, various changes may be made to FIGS. 5A and 5B. For example, profiles could support any number of operating states or modes, including any number of performance states or modes. Although FIG. 6 illustrates one example of a graph 600 representing time response curves for different operating state or mode profiles for a group of computing devices, various changes may be made to FIG. 6. For instance, different profiles could behave differently in response to load steps.

Figure 7:
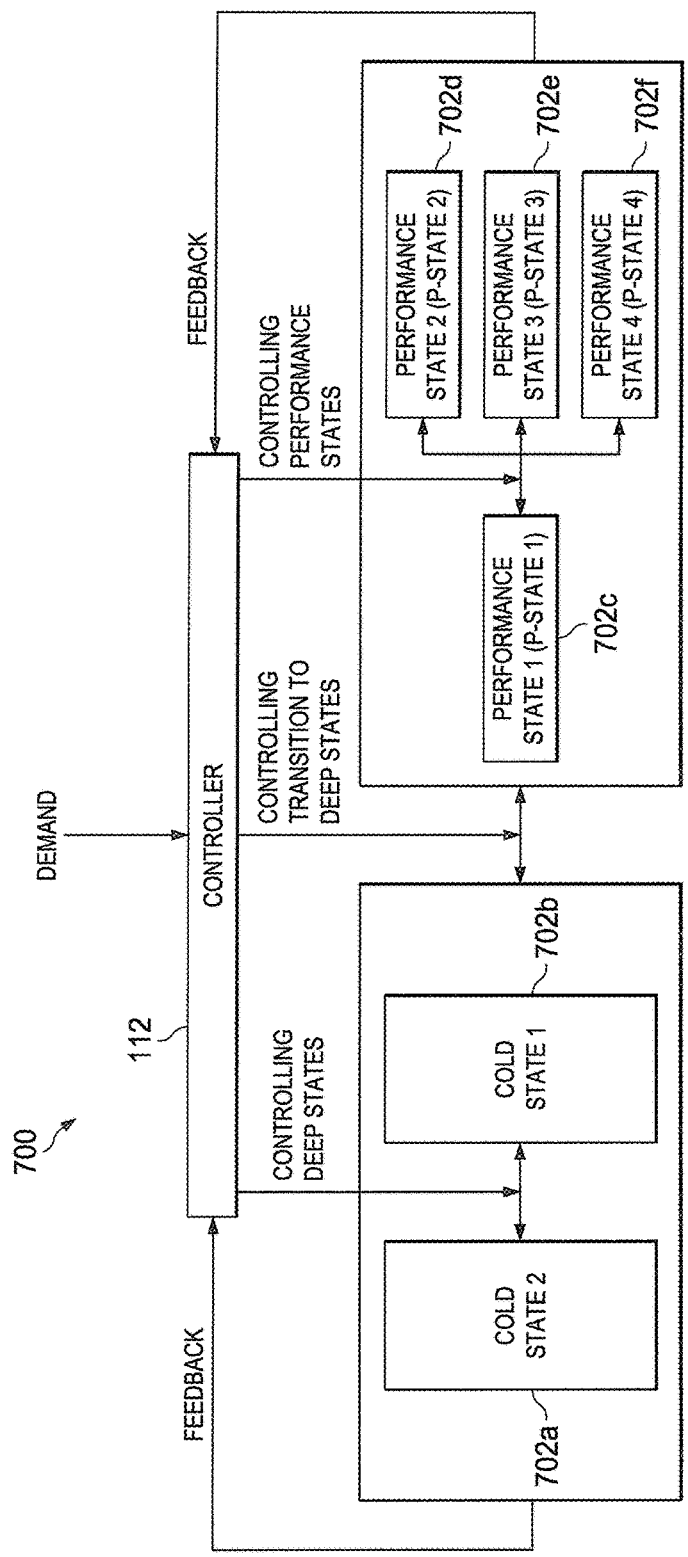
FIG. 7 illustrates an example of multivariable control for operating states or modes of a computing device according to this disclosure.

FIG. 7 illustrates an example of multivariable control 700 for operating states or modes of a computing device according to this disclosure. As shown in FIG. 7, the multivariable controller 112 receives input in the form of a measure of customer demand for computing resources. Note that this could be a measure of actual customer demand and/or a predicted amount of customer demand. The multivariable controller 112 also receives input in the form of feedback related to the computing devices that provide the computing resources. The feedback could have various forms, such as the status of the servers' states or modes and available computation power in the servers. The multivariable controller 112 performs control operations to vary the operating states or modes of the computing devices using that information. In this example, the computing devices support six operating states or modes 702a-702f, namely two standby/sleep states 702a-702b (one of which could be considered an "off" state) and four performance states 702c-702f. The performance states 702c-702f can be associated with different CPU clock frequencies.

Various information about the computing devices can be gathered or generated by the multivariable controller 112. For example, in some embodiments, the multivariable controller 112 can collect performance information about the computing devices and aggregate the data to generate key performance indices (KPIs) for the computing devices. Alternatively, an external component can collect the performance information, generate the KPIs, and provide the KPIs to the multivariable controller 112. The multivariable controller 112 uses the KPIs to determine how to adjust the number of servers operating in each state or mode.

In some embodiments, the multivariable controller 112 uses the customer demand as a disturbance variable. The customer demand can be considered by the multivariable controller 112 but generally cannot be controlled by the multivariable controller 112.

Also, in some embodiments, the multivariable controller 112 uses the following values as controlled variables:
- for each performance state, an aggregated KPI of CPUs in that performance state (four aggregated KPIs in this example since there are four performance states);
- for each operating state, a number of CPUs in that operating state (six numbers of CPUs in this example since there are six operating states); and
- an overall power usage for all computing devices.

Any suitable aggregations could be used as controlled variables. These aggregations could include aggregations on CPU usage, CPU utilization, memory utilization, hard drive utilization, or other performance indices. In some approaches, controlled variables can be selected as those variables having an effect on SLA violations. These are the variables that could be controlled in order to both (i) honor limitations of those controlled variables while (ii) minimizing SLA violations. Also note that an aggregation could be determined in any suitable manner, such as by calculating an average value of some characteristic or identifying the average value of some characteristic for a subset of servers (like an upper quartile of servers in a pool).

In addition, in some embodiments, the multivariable controller 112 could use the following as manipulated variables:
- a number of CPUs in each operating state (six numbers of CPUs in this example since there are six operating states).

These manipulated variables could be implemented using the following commands:
- commands to migrate x number of CPUs from performance state 1 to performance state i (i=2, 3, 4);
- commands to migrate x number of CPUs from performance state i (i=2, 3, 4) to performance state 1;
- commands to migrate x number of CPUs from performance state 1 to standby/sleep state 1;
- commands to migrate x number of CPUs from standby/sleep state 1 to performance state 1; and
- commands to migrate x number of CPUs from standby/sleep state i to standby/sleep state j.

In these embodiments, the multivariable controller 112 could generate a control solution that identifies the desired number of CPUs to be placed into each operating mode or state. This could be expressed as a profile identifying the number of CPUs in each mode or state. The profile can be generated in order to minimize power consumption and/or minimize response time while satisfying the customer demand. The multivariable controller 112 or another component could then use the profile in order to adjust the actual operating states or modes of various computing devices to implement the control solution.

In other embodiments, the multivariable controller 112 could use the following as manipulated variables:
- a number of CPUs migrating from performance state 1 to performance state i (i=2, 3, 4) (three manipulated variables here—one for performance state 2, one for performance state 3, and one for performance state 4);
- a number of CPUs migrating from performance state i (i=2, 3, 4) to performance state 1 (three manipulated variables here—one for performance state 2, one for performance state 3, and one for performance state 4);
- a number of CPUs migrating from performance state 1 to standby/sleep state 1;
- a number of CPUs migrating from standby/sleep state 1 to performance state 1; and
- a number of CPUs migrating from standby/sleep state i to standby/sleep state j (two manipulated variables here—one for standby/sleep state 1 to standby/sleep state 2 and one for standby/sleep state 2 to standby/sleep state 1).

In this example, the number of CPUs migrating between modes or states are used directly as manipulated variables.

In still embodiments, the multivariable controller 112 could use the following as manipulated variables:
- a collective number of CPUs in all performance states (performance state 1 to performance state 4 in this example);
- a number of CPUs migrating from performance state 1 to performance state i (i=2, 3, 4) (three manipulated variables here—one for performance state 2, one for performance state 3, and one for performance state 4);

a number of CPUs migrating from performance state i (i=2, 3, 4) to performance state 1 (three manipulated variables here—one for performance state 2, one for performance state 3, and one for performance state 4); and a number of CPUs migrating from standby/sleep state i to standby/sleep state j (two manipulated variables here—one for standby/sleep state 1 to standby/sleep state 2 and one for standby/sleep state 2 to standby/sleep state 1).

In general, any suitable combination of manipulated variables, including those identified above, could be used by the multivariable controller 112 as long as those manipulated variables can be used to alter the desired controlled variable(s) and satisfy the desired objective(s).

Although FIG. 7 illustrates one example of multivariable control 700 for operating states or modes of a computing device, various changes may be made to FIG. 7. For example, the disturbance, controlled, and manipulated variables identified above are for illustration only, and other or additional variables could be used by the multivariable controller 112. Also, any suitable combination of the disturbance, controlled, and/or manipulated variables identified above could be used by the multivariable controller 112. Further, the disturbance, controlled, and manipulated variables identified above could be used in any suitable system, such as the system 100 of FIGS. 1A and 1B. In addition, the various commands shown above are used to adjust the numbers of CPUs in each of the six operating states or modes shown in FIG. 7. Similar types of commands could be used to alter the numbers of CPUs operating in other states or modes, depending on the computing devices being controlled.

Figure 8A:
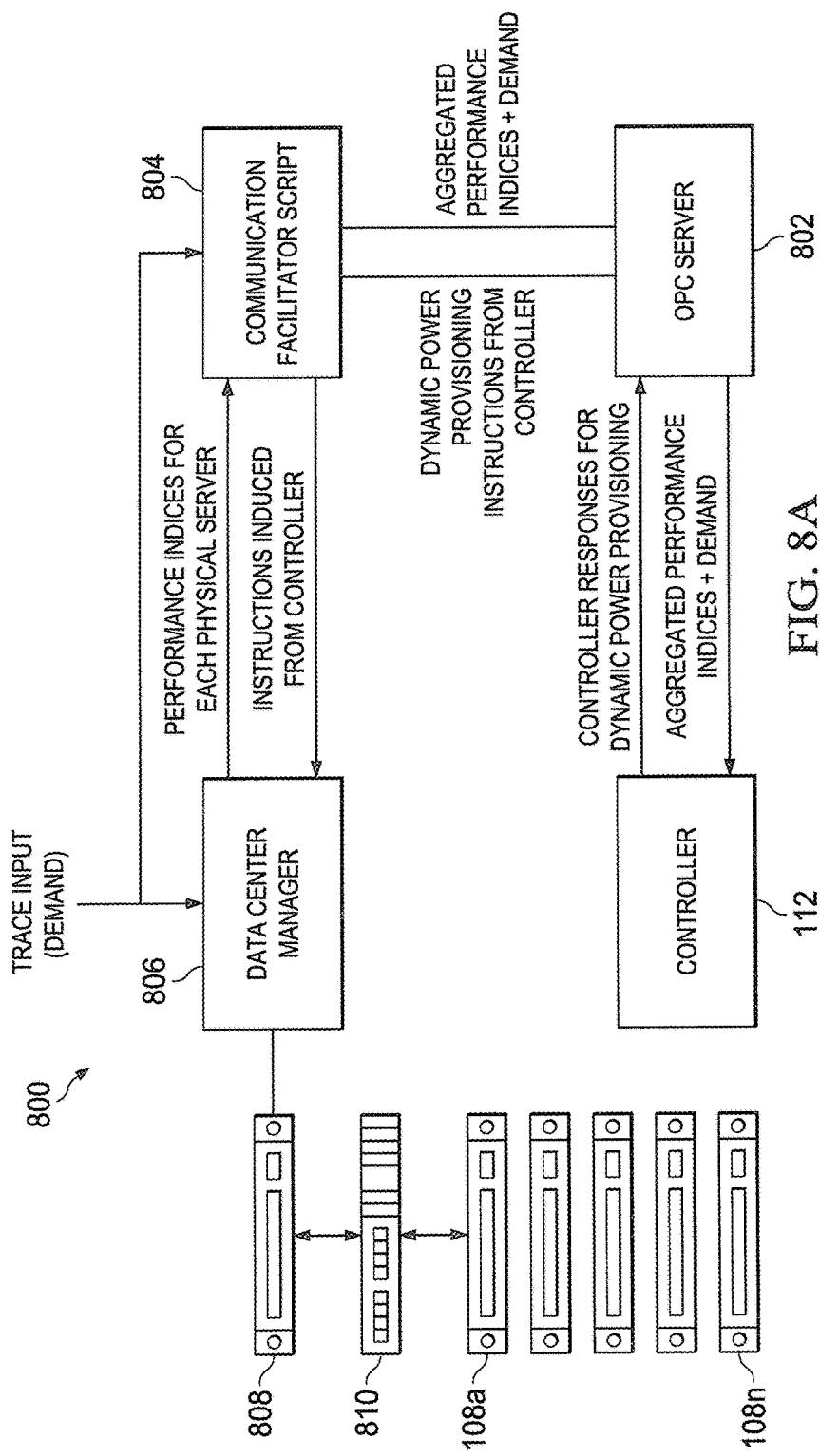

FIGS. 8A through 8C illustrate examples of specific implementations of control systems 800, 820, 840 for power-latency management to support optimization of data centers or other systems according to this disclosure. As shown in FIG. 8A, the multivariable controller 112 transmits and receives data related to the computing servers 108a-108n. This can occur using any suitable mechanism. For example, the multivariable controller 112 could obtain information using an Object Linking and Embedding (OLE) for Process Control (OPC) protocol, process historians, or EXCEL plug-ins. Depending on the protocol used in a data center's management level, custom communication application programming interfaces (APIs) could be used.

In this example, the multivariable controller 112 communicates with an OPC server 802. The OPC server 802 supports the communication of real-time plant data between devices of various manufacturers. In some embodiments, the OPC server 802 provides aggregated KPI values and demand values to the multivariable controller 112 and receives commands for dynamic power provisioning from the multivariable controller 112.

The OPC server 802 in this example communicates and exchanges data with a communication facilitator script 804. The communication facilitator script 804 receives performance indices for the computing servers from a data center manager 806 and calculates the aggregated KPI values. The communication facilitator script 804 also provides the aggregated KPI values and the demand values to the multivariable controller 112 via the OPC server 802. In addition, the communication facilitator script 804 receives commands for dynamic power provisioning from the multivariable controller 112 via the OPC server 802 and outputs instructions to the data center manager 806 based on the commands. In general, the communication facilitator script 804 is able to interpret commands and control actions of the multivariable controller 112 for the data center manager 806. Note, however, that the communication facilitator script 804 may not be required, such as when the functionality of the communication facilitator script 804 is incorporated into the data center manager 806, the OPC server 802, or the multivariable controller 112.

The data center manager 806 gathers information about the physical computing servers and initiates commands to the computing servers, such as commands to change the operating states or modes of the computing servers. The data center manager 806 can gather any suitable information from the computing servers for use in generating the KPI values. For instance, Table 1 identifies example types of information that could be collected by the data center manager 806 and provided to the communication facilitator script 804. Table 1 also identifies how the communication facilitator script 804 could use this information to generate KPI values.

TABLE 1

| Information from Data Center Manager | KPIs |
|---|---|
| % used for CPUs | Statistical aggregation for calculating the KPI |
| % util for CPUs | Statistical aggregation for calculating the KPI |
| Performance state of CPUs | Aggregate number of CPUs in each performance state |
| Standby/sleep state of CPUs | Aggregate number of CPUs in each standby/sleep state |
| Demand input | Perform any calculations for preparing Demand input to be used by the controller 112 |
| Transition status of devices between standby/sleep states | Calculate total amount of computation power available in each execution and transition status of devices |
| Power usage of devices | Aggregate overall power usage by devices |

The % util value (which is unaffected by clock frequency) represents the number of clock cycles counted when a CPU was in a non-idle state divided by a time period. The % used value (which is affected by clock frequency) represents the number of unhalted clock cycles of a CPU divided by a time period. In some embodiments, the data center manager 806 could be implemented using the VSPHERE software product from VMWARE, and the variables % util and % used are supported by that software product. However, any other suitable implementation of the data center manager 806 could be used.

In this example, the data center manager 806 can be executed or supported by a managing server 808, which represents the hardware used to collect information from the computing servers 108a-108n and interact with the communication facilitator script 804. Also, in this example, the managing server 808 can interact with the computing servers 108a-108n via a switch 810 or other network device.

In some embodiments, the multivariable controller 112 executes at a specified interval. During each interval, the multivariable controller 112 uses one or more models and information from the data center manager 806 to solve an optimization problem. During this process, the multivariable controller 112 determines how to adjust its manipulated variables (such as the number of computing servers 108a-108n operating in each state or mode) to keep its controlled variables (such as server KPIs) at or near desired setpoints or within desired ranges while satisfying one or more goals (such as minimizing power consumption or response time). The results obtained from this process are used to generate commands and output signals for controlling the computing servers 108a-108n to reduce or minimize power usage while satisfying any SLA requirements.

Table 2 summarizes example instructions received from the multivariable controller 112 and how the communication facilitator script 804 interprets the instructions for the data center manager 806. While Table 2 illustrates an example with four active (performance) modes or states and two sleep/standby modes or states, other numbers of modes or states are possible. The variable "x" in Table 2 indicates a variable that is computed by the controller 112.

TABLE 2

| Instructions from Controller | Commands to Data Center Manager |
|---|---|
| x amount of CPUs from performance state 1 to performance state i (i = 2, 3, 4) | Take a list of CPUs in performance state 1 and indicate the CPUs to be migrated to performance state i (i = 2, 3, 4) based on their current status and load |
| x amount of CPUs from performance state i (i = 2, 3, 4) to performance state 1 | Take a list of CPUs in performance state i (i = 2, 3, 4) and indicate the CPUs to be migrated to performance state 1 based on their current status and load |
| x amount of CPUs from performance state 1 to standby/sleep state 1 | Take a list of CPUs that are candidates for migrating to a standby mode and initiate the command |
| x amount of CPUs from standby/sleep state 1 to performance state 1 | Take a list of CPUs in standby mode and indicate x amount of candidates to be migrated to performance state 1 |
| x amount of CPUs from standby/sleep state 1 to standby/sleep state 2 | Take a list of x amount of servers that are in standby/sleep state 1 and initiate command to be migrated to standby/sleep state 2 |
| x amount of CPUs from standby/sleep state 2 to standby/sleep state 1 | Take a list of x amount of servers that are in standby/sleep state 2 and initiate command to be migrated to standby/sleep state 1 |

Note, however, that the multivariable controller 112 could generate these commands itself.

As noted above, the multivariable controller 112 uses one or more models of a system to help solve the optimization problem. The models can represent the dynamic response of a data center or other system to the customer demand and to control instructions from the multivariable controller 112. For example, the models can identify how the power consumption of a data center varies based on changes in the customer demand and based on changes in the operating states or modes of the computing servers. Using these models, the multivariable controller 112 can predict and control the performance indices.

In order to build the models, various techniques could be used. As a particular example, the KPIs identified above could be monitored and recorded for a limited period of time (such as less than one day). During that time, the customer demand (workload) placed on the data center can fluctuate (either due to normal customer demands or artificially), and the demand's effects on the controller's variables can be recorded and analyzed. This allows one or more mathematical models to be created identifying how the data center reacts to the demand fluctuations. A similar approach can be used to build models describing the effects of the controller's commands on the performance indices. This allows one or more mathematical models to be created identifying how the data center reacts to the controller's commands.

After building the models for the data center and designing an appropriate model predictive controller, the performance of the multivariable controller 112 with those models can be tested. The testing can be done to help ensure that, for example, the multivariable controller 112 reliably reduces or minimizes power consumption in the data center without violating SLAs. During the testing, various customer demands with different variations can be placed on the data center (again, either due to normal customer demands or artificially). While the multivariable controller 112 operates to optimize the number of active servers and performance states within the data center, the performance indices can be recorded. Using the recorded data, a performance analysis can be performed to identify how much power has been saved using the multivariable controller 112 without violating SLAs. Also, during the testing, the robustness of the proposed dynamic power provisioning with respect to following issues could be tested.

Uncertainty within data center—there may be some uncertainty over whether any given server is available at any given time, such as when servers can become unavailable due to maintenance or power losses.

Categorizing various servers for different tasks—some or all servers may be dedicated to specific tasks, which could reduce the pool of available servers to be placed into reduced-power states.

Data communication failure—some data may be lost due to various issues, and the behavior of the controller 112 can be tested to determine how well such data losses are handled.

Noise and un-predicted disturbances—random or unpredicted information can appear in the data used by the controller 112, and the behavior of the controller 112 can be tested to determine how well the controller 112 operates in the presence of such data.

In FIGS. 8B and 8C, the systems 820 and 840 have integrated the communication facilitator script 804 into an application programming interface (API) 822, and the data center manager 806 is configured to communicate via the API 822. A software development kit (SDK) 824 can be provided for designing the API 822 for use in particular systems. In FIG. 8B, the API 822 is designed to communicate with the controller 112 via a function block 826, such as a DLL file. The function block 826 can be designed via its own SDK 828. The use of a function block 826 may be required if the controller 112 uses function blocks. In FIG. 8C, the API 822 is designed to communicate with the controller 112 via the OPC server 802.

Although FIGS. 8A through 8C illustrate examples of specific implementations of control systems for power-latency management to support optimization of data centers or other systems, various changes may be made to FIGS. 8A through 8C. For example, any other suitable mechanism could be used to collect information from the computing servers 108a-108n and to provide the information to the multivariable controller 112. Also, the multivariable controller 112 could be configured to calculate the KPI values using information from the data center. Further, the contents of the tables above are for illustration only, and any other or additional information, KPIs, and commands could be used. In addition, the various model-building and controller-testing techniques described above could be used in other systems, including the system 100 of FIGS. 1A and 1B.

FIGS. 9A through 9D illustrate example simulation results of multivariable control for power-latency management to support optimization of data centers or other systems according to this disclosure. In this example, the multivariable control strategy is connected to a simulated data center in which the power and response time of servers is simulated mathematically. Also, a control strategy used by the multivariable controller 112 attempts to keep the average CPU utilization of the simulated active servers between user-defined limits (such as between 70% to 85%) while minimizing power usage. Also, constraints are placed on the control strategy to prevent aggressive changes to any individual server's mode or state, such as by preventing too many changes to any individual server's mode or state within a given time period.

Figure 9A:
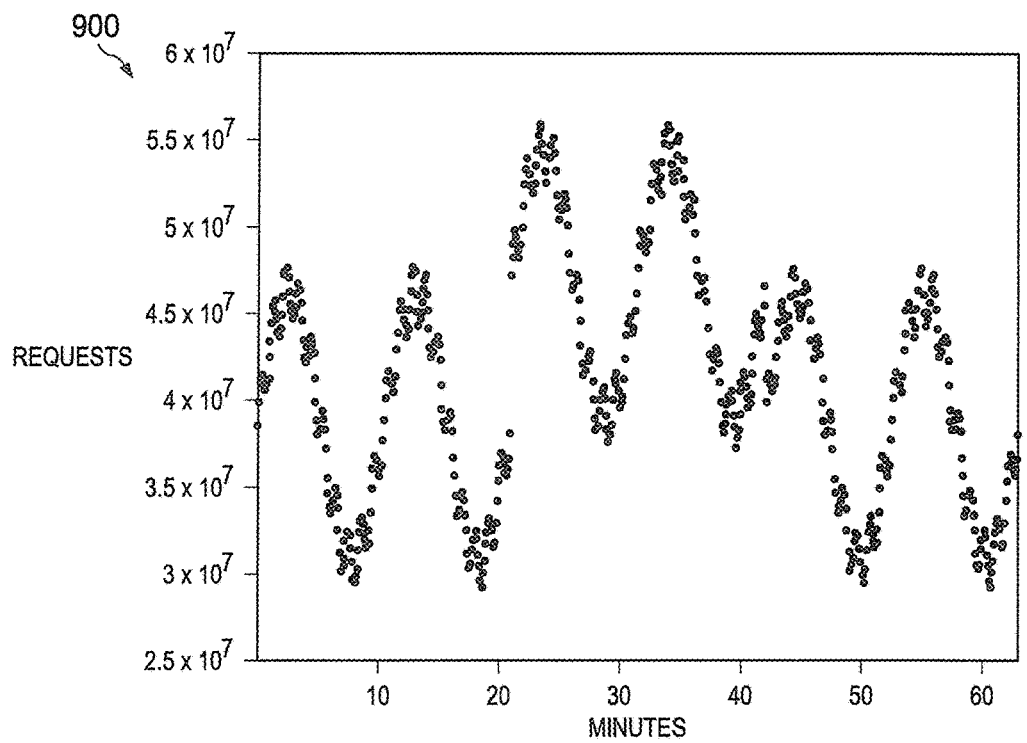
FIGS. 9A through 9D illustrate example simulation results of multivariable control for power-latency management to support optimization of data centers or other systems according to this disclosure.
Figure 9B:
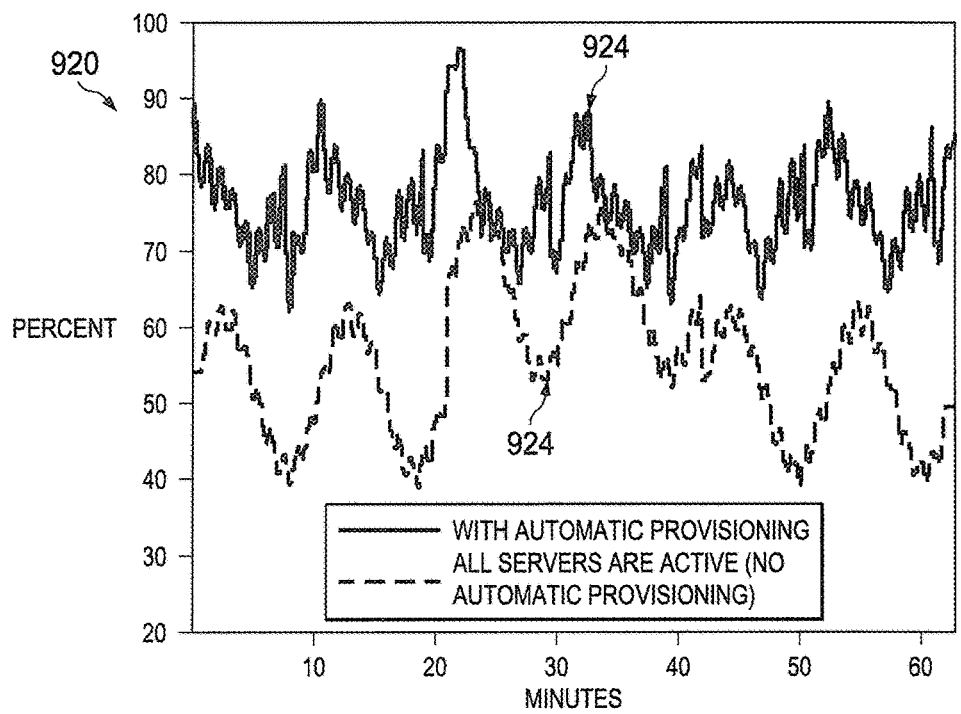

In FIG. 9A, a graph 900 represents workload (demand) placed on a simulated data center. In FIG. 9B, a graph 920 represents average CPU utilization for active servers over time to satisfy the demand shown in FIG. 9A. Here, a line 922 denotes average CPU utilization for all servers over time without automatic provisioning by the multivariable controller 112, and a line 924 denotes average CPU utilization for active servers over time with automatic provisioning by the multivariable controller 112. As can be seen in FIG. 9B, without the multivariable controller 112, the servers of a data center generally operate at lower CPU utilizations. This is generally undesirable because it indicates that more servers are active (and therefore consuming more power) but those servers are not being utilized to a desired level. In contrast, with the case using the multivariable controller 112, the active servers of the data center are operating at higher CPU utilizations. This is generally desirable because it indicates more servers can be placed into lower-power states or modes since the workload is being concentrated among fewer active servers. Moreover, the active servers are (for the most part) staying within the desired CPU utilization range of 70% to 85%, which may be a desirable range because it represents the range where CPU utilization is most cost effective in terms of power consumption versus wear and tear on the servers.

Figure 9C:
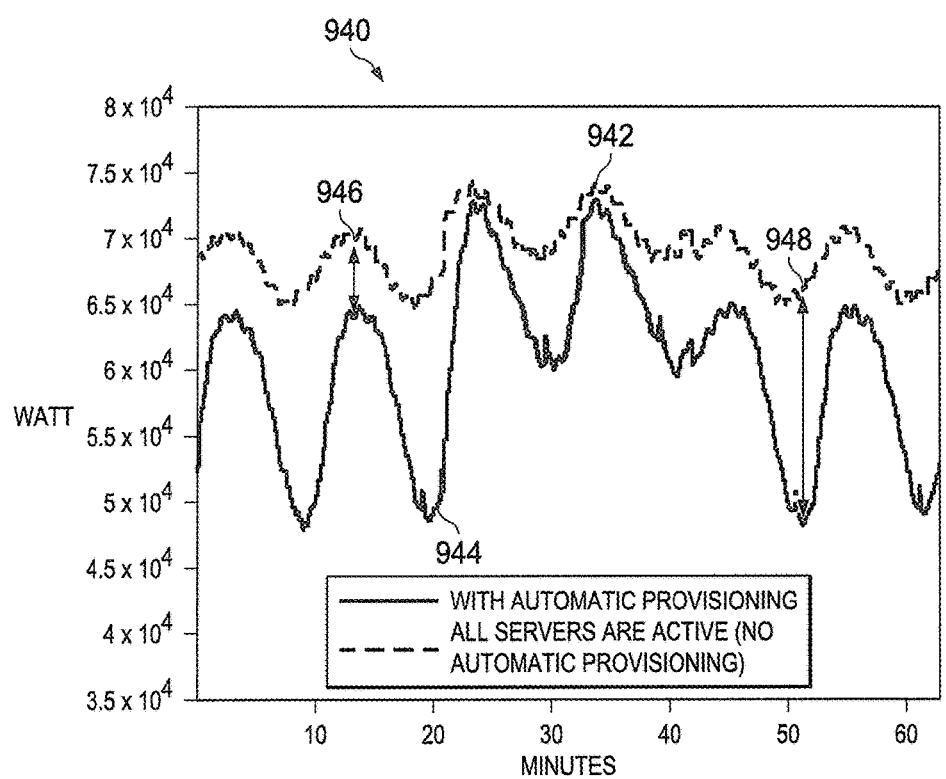

In FIG. 9C, a graph 940 represents overall power consumption for the data center over time as the data center satisfies the demand shown in FIG. 9A. Here, a line 942 denotes overall power consumption without automatic provisioning by the multivariable controller 112, and a line 944 denotes overall power consumption with automatic provisioning by the multivariable controller 112. As can be seen here, the multivariable controller 112 is able to reduce (sometimes drastically) overall power consumption of the data center by helping to concentrate processing loads on active servers while allowing more servers to enter lower-power modes of operation. The exact amount of power savings can be dependent on a number of factors, including current demand. In FIG. 9C, for example, the power savings at a point 946 when demand is relatively high could be smaller, such as around 8%. The power savings at another point 948 when demand is relatively low could be larger, such as around 27%. In either case, the use of the multivariable controller 112 can provide significant cost savings for a data center.

Figure 9D:
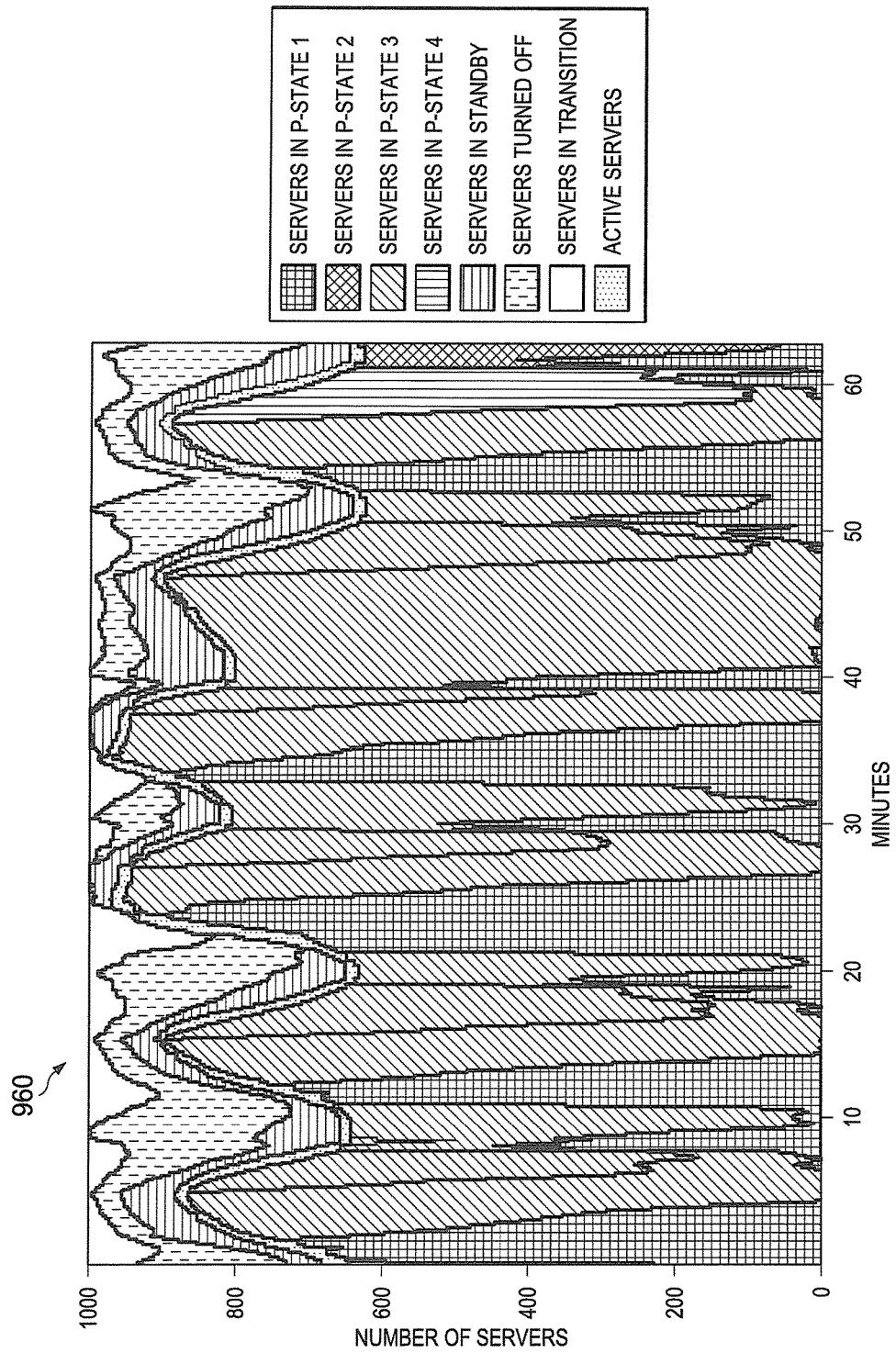

In FIG. 9D, a graph 960 identifies the numbers of servers in different operating states or modes over time as the data center satisfies the demand shown in FIG. 9A. As can be seen here, the multivariable controller 112 modifies the profile of the data center over time to help satisfy the changing customer demand, where the profile identifies the numbers of servers operating in each mode or state. These modifications can occur while the multivariable controller 112 ensures that the data center has an acceptable response time.

Although FIGS. 9A through 9D illustrate examples of simulation results of multivariable control for power-latency management to support optimization of data centers or other systems, various changes may be made to FIGS. 9A through 9D. For example, the simulation results shown here are examples only and are not meant to constrain this disclosure to any particular implementation of the multivariable controller 112 or any particular results obtained using the multivariable controller 112.

Figure 10:
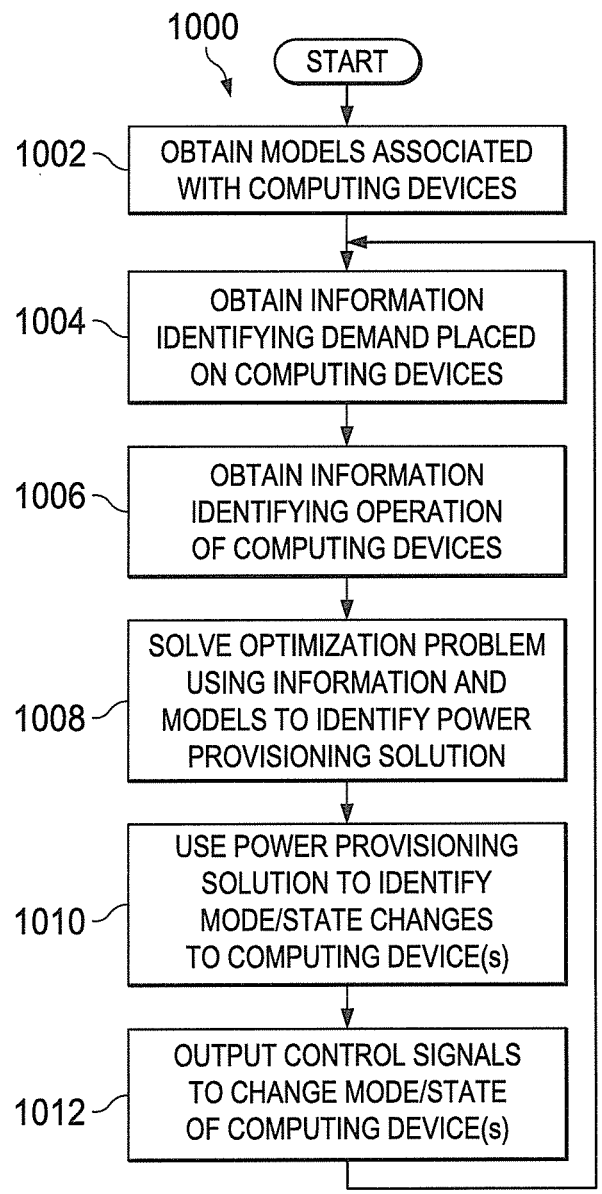
FIG. 10 illustrates an example method of providing multivariable control for power-latency management to support optimization of data centers or other systems according to this disclosure.

FIG. 10 illustrates an example method 1000 of providing multivariable control for power-latency management to support optimization of data centers or other systems according to this disclosure. For ease of explanation, the method 1000 is described as being performed by the multivariable controller 112 for computing servers 108a-108n in one or more data centers 106a-106m of the system 100 of FIGS. 1A and 1B. However, the method 1000 could be used by any suitable device in any suitable system to control the power consumption of any suitable computing devices.

As shown in FIG. 10, one or more models associated with computing devices are obtained at step 1002. This could include, for example, the multivariable controller 112 retrieving one or more models from memory or other storage location(s). This could also include the multivariable controller 112 actively measuring responses of one or more controlled variables to changes in one or more manipulated variables and mathematically computing one or more models (such as in a standard control engineering procedure known as "model identification"). The models can include at least one model that identifies how one or more data centers 106a-106m react to changes in customer demand while still satisfying any SLA requirements. The models can also include at least one model that identifies how one or more data centers 106a-106m react to commands from the multivariable controller 112, such as how the power consumption of a data center varies in response to changes in the server profile for the data center. In many instances, the models are typically created or identified during the design of the multivariable controller 112, and the remaining steps in FIG. 10 occur in real-time once the multivariable controller 112 is designed, commissioned, and placed into operation.

Information identifying a demand placed on the computing devices is obtained at step 1004. This could include, for example, the multivariable controller 112 receiving information identifying the current customer demand placed on the computing servers 108a-108n of the data center(s) 106a-106m. The information identifying the current customer demand could be received from one or more data center managers 806 directly or indirectly, such as via the OPC server 802 and the communication facilitator script 804. Of course, the information identifying the current customer demand could also be received from other sources. This could also include the multivariable controller 112 or an external component generating a prediction of future customer demand.

Information identifying operation of the computing devices is obtained at step 1006. This could include, for example, the multivariable controller 112 receiving or calculating KPI values or other performance-related identifying one or more performance characteristics of the computing servers 108a-108n of the data center(s) 106a-106m. The KPI values could be calculated by any suitable component(s), such as the data center manager 806, communication facilitator script 804, or multivariable controller 112. Note that any suitable KPI values could be obtained here, including any or all of the KPI values identified in Table 1 above.

An optimization problem is solved using the obtained information and models to identify a power provisioning solution at step 1008. This could include, for example, the multivariable controller 112 solving an economic optimization problem to determine how to adjust the operating states or modes of the computing servers 108a-108n in the data center(s) 106*a*-106*m* while minimizing power consumption, minimizing response time, and satisfying current or predicted customer demand. The result of this process can be a profile identifying the number of CPUs or computing servers to be placed in each operating state or mode.

The power provisioning solution is used to identify mode or state changes to one or more of the computing devices at step 1010. This could include, for example, the multivariable controller 112, communication facilitator script 804, or data center manager 806 identifying one or more servers that need to change states or modes in order to satisfy the profile generated by the multivariable controller 112. Control signals to change the modes or states of the one or more computing devices are generated and output at step 1012. This could include, for example, the multivariable controller 112, communication facilitator script 804, or data center manager 806 generating control signals that cause one or more of the computing servers 108*a*-108*n* in the data center(s) 106*a*-106*m* to change state or mode. Note that any suitable commands could be used here, including any or all of the commands identified in Table 2 above.

The process can then return to step 1004 to repeat the process of obtaining information and generating an updated profile for the data center(s). Ideally, during this process, the computing servers 108*a*-108*n* of the data center(s) 106*a*-106*m* have a reduced overall power consumption while still providing suitable response times.

Although FIG. 10 illustrates one example of a method 1000 of providing multivariable control for power-latency management to support optimization of data centers or other systems, various changes may be made to FIG. 10. For example, while shown as a series of steps, various steps in FIG. 10 could overlap, occur in parallel, occur in a different order, or occur any number of times. As a particular example, the demand and operation information could be collected continuously or at more frequent interval(s), while the optimization problem could be solved at a less frequent interval.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   identifying demand for computing resources provided by multiple computing devices, wherein the multiple computing devices correspond to multiple servers located at one or more location;
   identifying operating states or modes for the computing devices based on the identified demand using a multivariable controller, the multivariable controller configured to determine how to alter multiple manipulated variables in order to create changes to multiple controlled variables;
   generating one or more models using historical data;
   correlating changes to the operating states or modes of the computing devices with changes in power consumption or with changes in response time, using the generated one or more models;
   generating a profile identifying a number of computing devices or processing units to operate in each of the operating states or modes;
   identifying one or more of the computing devices or processing units to undergo one or more state or mode changes based on the profile; and
   generating one or more control signals to trigger the one or more state or mode changes in the one or more computing devices or processing units,
   wherein the multiple manipulated variables include the operating states or modes of the computing devices; and wherein the multiple controlled variables include a power consumption of the computing devices and a response time of the computing devices.

2. The method of claim 1, wherein the operating states or modes of the computing devices are identified in order to reduce or minimize the power consumption of the computing devices.

3. The method of claim 1, wherein:
each of the computing devices includes one or more processing units;
each of the computing devices or processing units is configured to selectively operate in one of the operating states or modes.

4. The method of claim 1, wherein the one or more control signals comprise at least one of:
a command to migrate a first specified number of processing units from a first performance state to another performance state;
a command to migrate a second specified number of processing units from another performance state to the first performance state;
a command to migrate a third specified number of processing units from the first performance state to a first standby/sleep state;
a command to migrate a fourth specified number of processing units from the first standby/sleep state to the first performance state; and
a command to migrate a fifth specified number of processing units from one standby/sleep state to another standby/sleep state.

5. The method of claim 1, wherein:
each of the computing devices includes one or more processing units; and
the controlled variables further comprise multiple aggregated performance indicators, each performance indicator identifying an aggregate performance characteristic for all of the computing devices or processing units in one of the operating states or modes.

6. The method of claim 1, wherein the multivariable controller handles the demand for the computing resources as a disturbance variable.

7. The method of claim 1, wherein the multivariable controller is configured to solve an optimization problem in order to reduce or minimize the power consumption of the computing devices while ensuring that the computing devices provide an amount of computing resources to satisfy the demand while providing a specified level of service to users of the computing resources.

8. An apparatus comprising:
a multivariable controller comprising at least one processing device configured to: identify demand for computing resources provided by multiple computing devices, wherein the multiple computing devices correspond to multiple servers located at one or more location;
identify operating states or modes for the computing devices based on the identified demand;
generate one or more models using historical data;
correlate changes to the operating states or modes of the computing devices with changes in power consumption or with changes in response time, using the generated one or more models;
generate a profile identifying a number of computing devices or processing units to operate in each of the operating states or modes;
identify one or more of the computing devices or processing units to undergo one or more state or mode changes based on the profile; and
generate one or more control signals to trigger the one or more state or mode changes in the one or more computing devices or processing units,
wherein the at least one processing device is configured to identify the operating states or modes for the computing devices by determining how to alter multiple manipulated variables in order to create changes to multiple controlled variables;
wherein the multiple manipulated variables include the operating states or modes of the computing devices; and
wherein the multiple controlled variables include a power consumption of the computing devices and a response time of the computing devices.

9. The apparatus of claim 8, wherein the at least one processing device is configured to identify the operating states or modes of the computing devices in order to reduce or minimize the power consumption of the computing devices.

10. The apparatus of claim 8, wherein:
each of the computing devices includes one or more processing units;
each of the computing devices or processing units is configured to selectively operate in one of the operating states or modes.

11. The apparatus of claim 8, wherein:
each of the computing devices includes one or more processing units; and
the controlled variables further comprise multiple aggregated performance indicators, each performance indicator identifying an aggregate performance characteristic for all of the computing devices or processing units in one of the operating states or modes.

12. The apparatus of claim 8, wherein the multivariable controller is configured to solve an optimization problem in order to reduce or minimize the power consumption of the computing devices while ensuring that the computing devices provide an amount of computing resources to satisfy the demand while providing a specified level of service to users of the computing resources.

13. The apparatus of claim 12, wherein the multivariable controller is configured to:
identify the demand for the computing resources by predicting or receiving a prediction of estimated future workload on the computing devices; and
treat the estimated future workload as a disturbance variable when solving the optimization problem.

14. A non-transitory computer readable medium containing computer readable program code that, when executed, causes at least one processing device of a multivariable controller to:
identify demand for computing resources provided by multiple computing devices, wherein the multiple computing devices correspond to multiple servers located at one or more location;
identify operating states or modes for the computing devices based on the identified demand by determining how to alter multiple manipulated variables in order to create changes to multiple controlled variables;
generate one or more models using historical data;
correlate changes to the operating states or modes of the computing devices with changes in power consumption or with changes in response time, using the generated one or more models;
generate a profile identifying a number of computing devices or processing units to operate in each of the operating states or modes;

identify one or more of the computing devices or processing units to undergo one or more state or mode changes based on the profile; and generate one or more control signals to trigger the one or more state or mode changes in the one or more computing devices or processing units, wherein the multiple manipulated variables include the operating states or modes of the computing devices; and wherein the multiple controlled variables include a power consumption of the computing devices and a response time of the computing devices.

15. The non-transitory computer readable medium of claim 14, wherein:

each of the computing devices includes one or more processing units;

each of the computing devices or processing units is configured to selectively operate in one of the operating states or modes.

16. The non-transitory computer readable medium of claim 14, wherein:

each of the computing devices includes one or more processing units;

the controlled variables further comprise multiple aggregated performance indicators, each performance indicator identifying an aggregate performance characteristic for all of the computing devices or processing units in one of the operating states or modes; and the computer readable program code that, when executed, causes the at least one processing device to identify the operating states or modes for the computing devices comprises:

computer readable program code that, when executed, causes the at least one processing device to solve an optimization problem in order to reduce or minimize the power consumption of the computing devices while ensuring that the computing devices provide an amount of computing resources to satisfy the demand while providing a specified level of service to users of the computing resources.

* * * * *